(12) United States Patent  (10) Patent No.: US 7,476,173 B2
Ko  (45) Date of Patent: Jan. 13, 2009

(54) PARK INHIBIT SOLENOID ASSEMBLY AND SYSTEM INCORPORATING THE SAME

(75) Inventor: Knight Ko, Quincy, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 339 days.

(21) Appl. No.: 11/277,702

(22) Filed: Mar. 28, 2006

(65) Prior Publication Data

US 2006/0217226 A1   Sep. 28, 2006

Related U.S. Application Data

(60) Provisional application No. 60/665,923, filed on Mar. 28, 2005.

(51) Int. Cl.
  *B60W 10/18* (2006.01)
(52) U.S. Cl. .................. 475/132; 74/335; 192/219.4
(58) Field of Classification Search ............... 74/335, 74/569, 588; 475/132; 192/219.4
  See application file for complete search history.

(56) References Cited

U.S. PATENT DOCUMENTS

| | | | | |
|---|---|---|---|---|
| 5,036,962 A | * | 8/1991 | Amagasa | 70/251 |
| 5,542,513 A | * | 8/1996 | Reyes | 192/219.4 |
| 5,799,517 A | * | 9/1998 | Hattori et al. | 70/247 |
| 6,431,339 B1 | * | 8/2002 | Beattie et al. | 192/220.4 |
| 6,880,419 B2 | * | 4/2005 | Berger et al. | 74/335 |
| 2004/0248687 A1 | | 12/2004 | Powell et al. | |

* cited by examiner

*Primary Examiner*—Ha D. Ho
(74) *Attorney, Agent, or Firm*—Grossman, Tucker, Perreault & Pfleger, PLLC

(57) ABSTRACT

A park inhibit solenoid system and system incorporating the same. The solenoid may include a bracket at least a portion of which may be generally u-shaped with a downwardly oriented opening. A generally u-shaped follower is at least partially disposed in the bracket and extendable therefrom. A solenoid may force a roller into a notch formed in the follower.

14 Claims, 8 Drawing Sheets

PARK INHIBIT SOLENOID ASSEMBLY AND SYSTEM INCORPORATING THE SAME

CROSS-REFERENCE TO RELATED APPLICATIONS

This application claims the benefit of the filing date of U.S. Provisional Application Ser. No. 60/665,923 filed Mar. 28, 2005, the teachings of which are hereby incorporated herein by reference.

FIELD

This invention relates to vehicle transmission systems, and, in particular, to a park inhibit solenoid assembly for selectively locking a vehicle transmission system in an out-of-park position.

BACKGROUND

Motorized vehicles include a power plant (e.g., engine or electric motor) that produces driving power. The driving power is transferred through a transmission to a driveline for driving a set of wheels at selected gear ratios. As is well known, automatic transmissions shift automatically to the appropriate gear ratio based on various vehicle operating conditions including speed and torque. Typically, a desired transmission operating mode or range is selected by the vehicle operator. The ranges provided by most automatic transmissions generally include Park, Neutral, Reverse and Drive. In Drive, the automatic transmission automatically shifts between three, four, five or even six different forward gear ratios based on the vehicle operating conditions.

Traditionally, a driver interface device is provided which the vehicle operator shifts to select the desired transmission range. The driver interface device may be linked to the automatic transmission by a range shift mechanism which may include a series of interconnected mechanical devices such as levers, push/pull rods, cables and the like. The number and size of such mechanical components make it difficult to package the range shift mechanism between the driver interface device and the transmission and can add significant frictional resistance to the overall system. As a result, the overall cost for design, manufacture and assembly of the vehicle is increased.

In an attempt to address such issues related to mechanically-shifted transmission range shift mechanisms, several electronic transmission range selection systems (ETRS) (also referred to as "shift-by-wire" range shift mechanisms) have been developed. Typically, an ETRS system includes an electric motor for controlling movement of the transmission's manual shaft to the desired range select position. Switches associated with a driver interface device send a mode signal to a transmission controller that is indicative of the selected transmission range. Thereafter, the controller actuates the electric motor to move the transmission manual shaft to the corresponding range select position.

To prevent the vehicle from inadvertently moving from an out-of-park condition to a park condition, a park inhibit solenoid assembly may be provided. One example of a park inhibit solenoid assembly is described in U.S. Patent Application Publication No. US 2004/0248687 A1, the teachings of which are incorporated herein by reference. Another example of a park inhibit solenoid assembly is shown in FIG. 1. The illustrated assembly includes a body portion 100 and a follower assembly 102. A solenoid 104 is energized to force a ball 106 into a notch 108 for locking the follower assembly 102 in an out-of-park position. If the solenoid 104 is de-energized, a ramp 112 on the follower pushes the ball 108 down to allow the solenoid move to the park position.

The illustrated assembly is difficult to manufacture. The body 100 may be machined or die cast with critical areas that require tight tolerance. The illustrated follower assembly 102 includes four parts; a cylindrical follower 110 with a ramp 112 machined at a prescribed location; a pin 114 positioned to ride in a slot in the body to limit travel; a hook 116 to engage with a park pawl; and a pin 118 for coupling the hook to the follower. The follower assembly 102 can be very costly to manufacture. Also, the ball 106 may be located in a pocket inside the body. Debris entering the pocket may prevent proper locking of the system. Moreover, the ball engages the follower at a specific location, leading to a potential for deformation. For example, an indentation may form at the point of contact between the ball and follower. The indentation may modify the intended direction of the force on the follower, thereby preventing proper operation of the system.

Accordingly, there is a need for a park inhibit solenoid assembly that is reliable and cost efficient in design.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the subject matter be viewed broadly.

DETAILED DESCRIPTION

For simplicity and ease of explanation, various embodiments will be described herein. It is to be understood, however, that illustrated exemplary embodiments described herein are provided only by way of illustration, and are not intended to be limiting.

Figure 1:
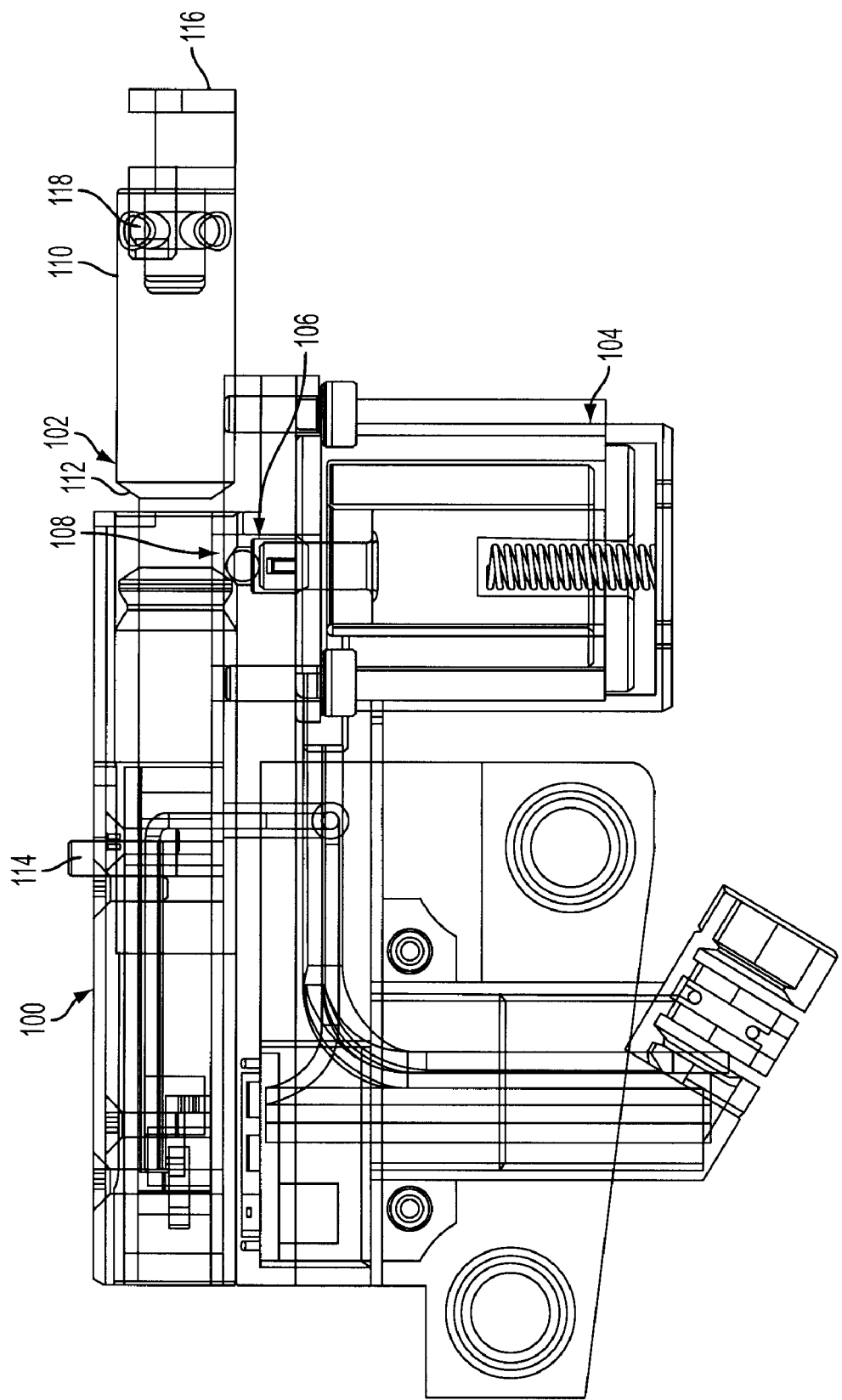
FIG. 1 is a schematic diagram of a prior art park inhibit solenoid assembly.
Figure 2:
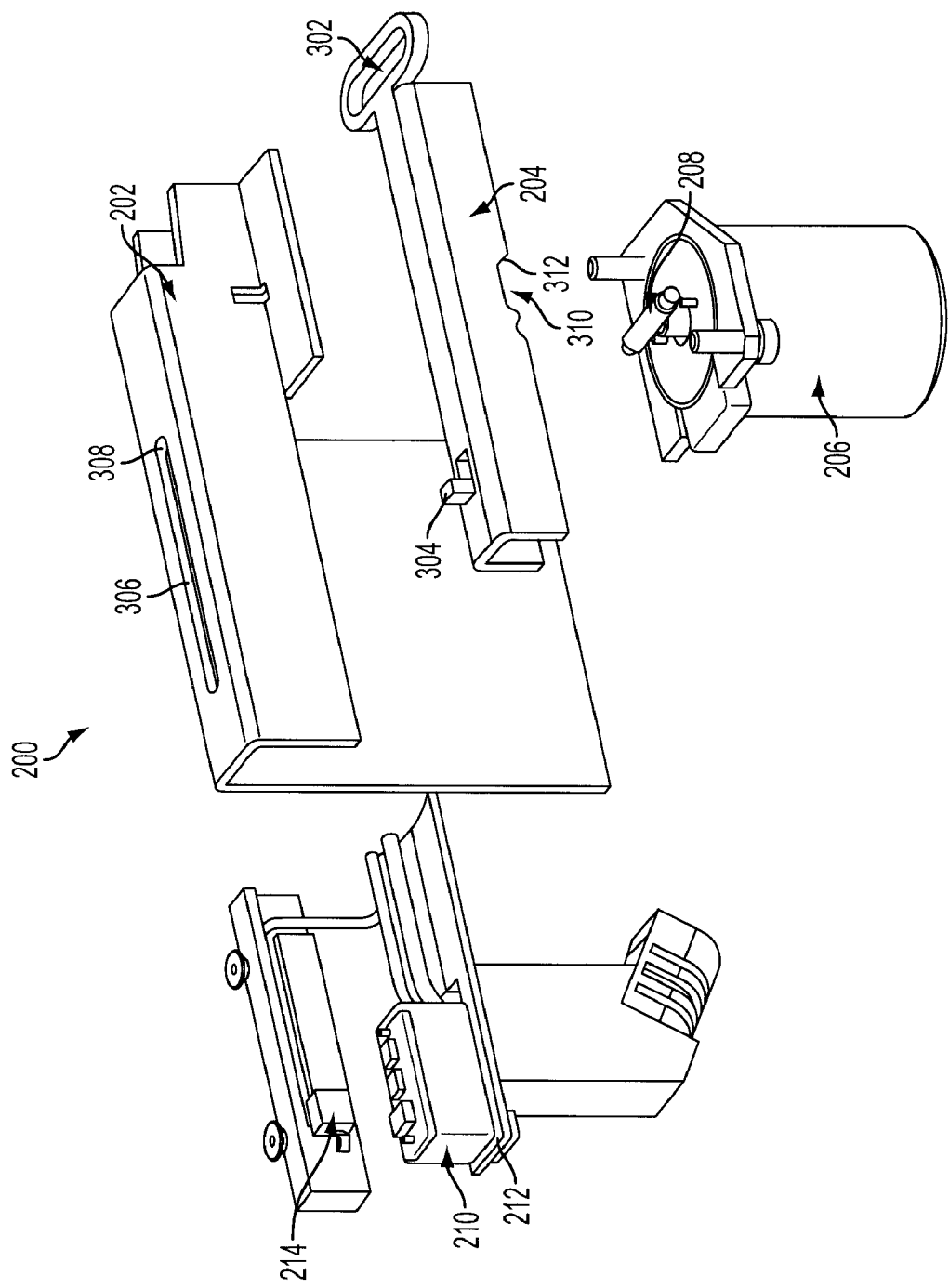
FIG. 2 is an exploded view of an exemplary park inhibit solenoid assembly consistent with the present invention.

A system consistent with the invention provides reliable locking of an ETRS system in an out-of-park position and may be cost-efficiently manufactured. FIG. 2 illustrates one exemplary embodiment of a park inhibit solenoid system 200 consistent with the present invention. As shown, the system includes a bracket 202, a follower 204 received at least partially within the bracket and extendable therefrom, a solenoid 206 for acting on a roller 208 to lock the follower in an out-of-park position, a Hall Effect sensor 210 carried on a printed circuit board 212, and a switch 214.

With reference to FIGS. 3-7, for example, the follower may be configured to engage a member 300 of the ETRS system, e.g. through a stamped slot 302 at the end of the follower 204. When the ETRS system is moved to an out-of-park position, the follower 204 may move with the member 300 to extend outward from an end of the bracket 202. A travel limiting tab 304 extending upward with respect to a top surface of the follower 204 may extend into a slot 306 formed in the bracket 202 and may engage an end 308 of the slot 306 to limit travel of the follower relative to the bracket.

Figure 3:
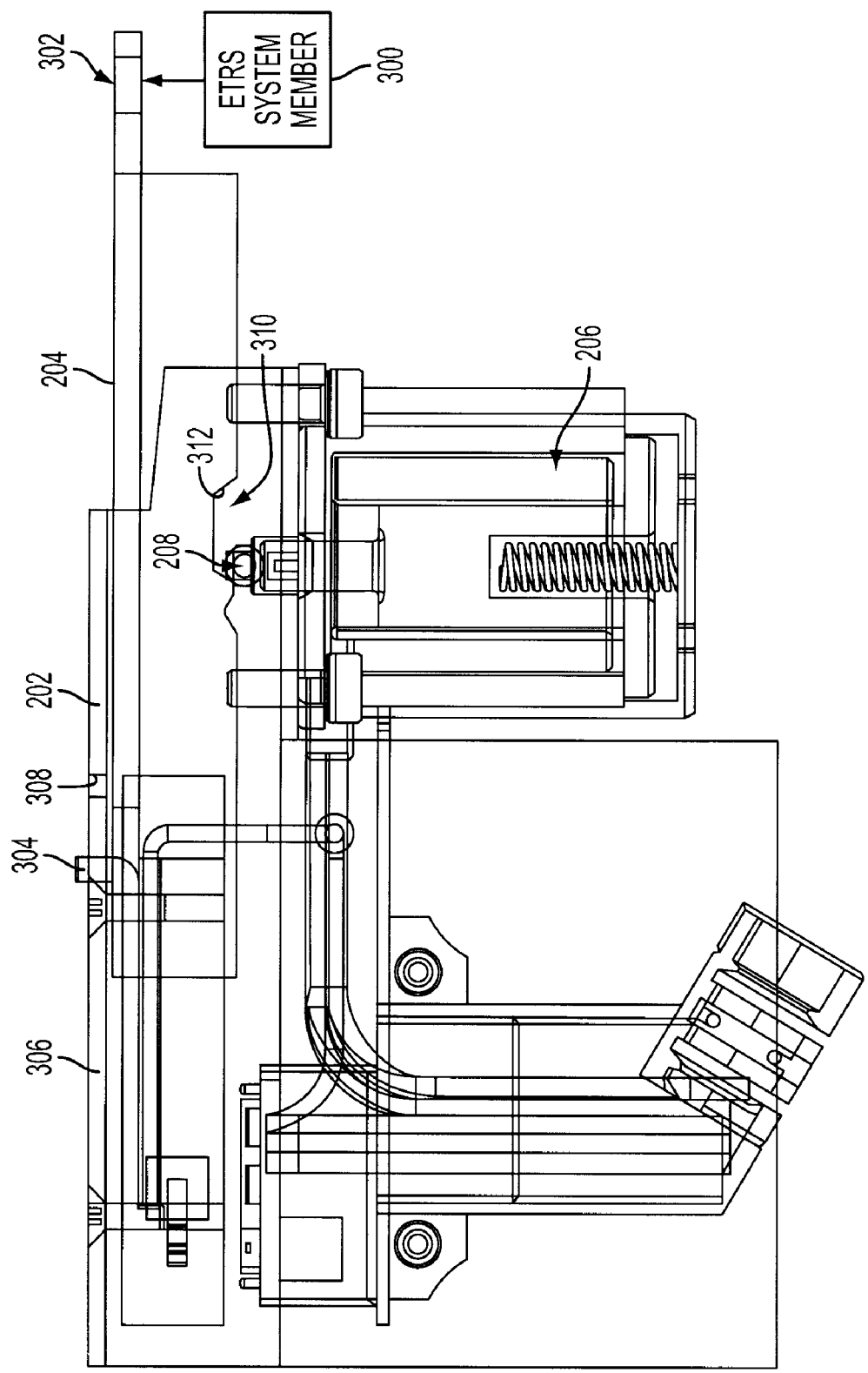
FIG. 3 is a schematic diagram of the assembly of FIG. 2 in an out-of-park position.
Figure 4:
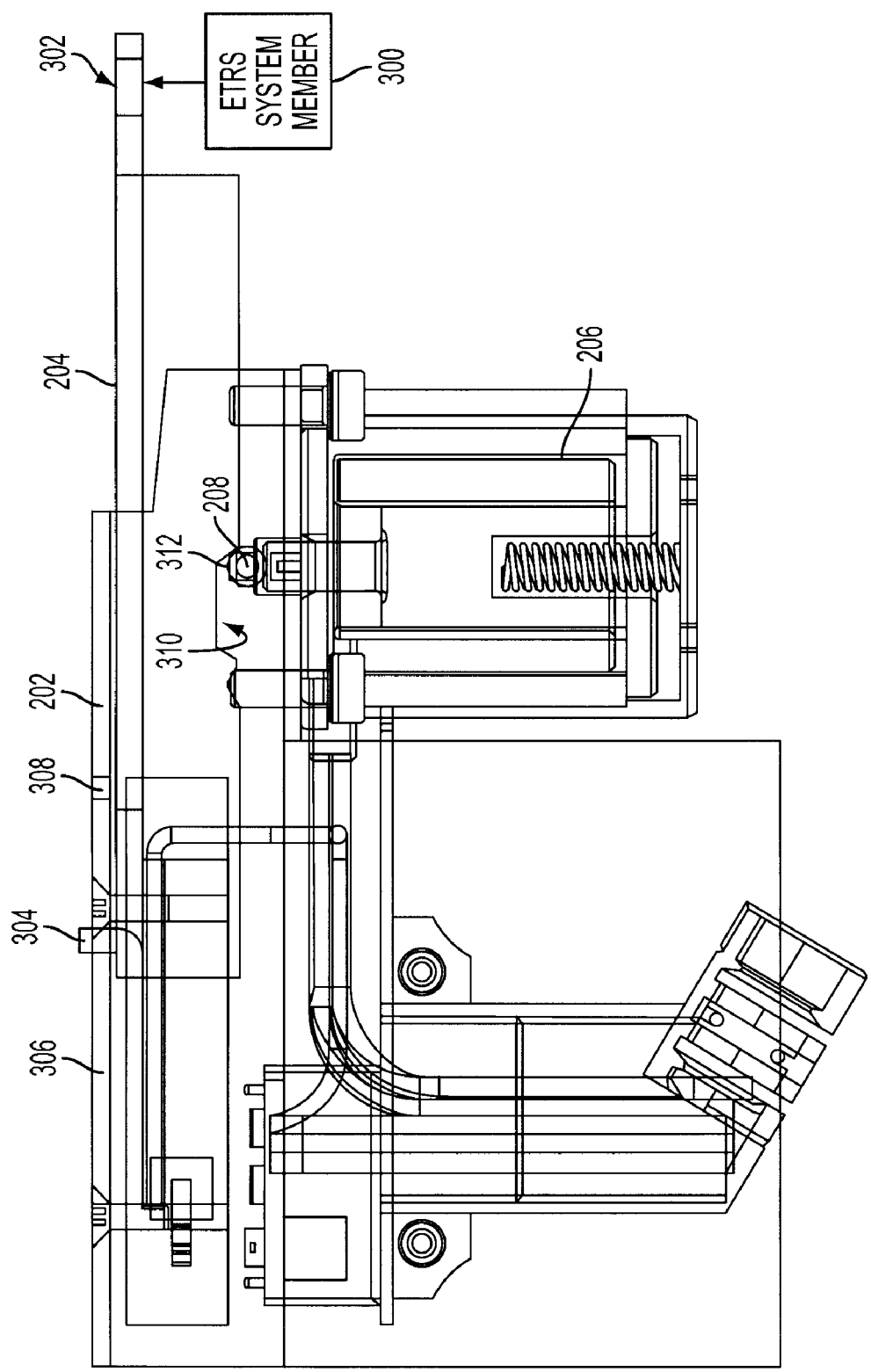
FIG. 4 is a schematic diagram of the assembly of FIG. 2 with the roller engaged with a ramp on the follower upon movement of the assembly to a park position.
Figure 5:
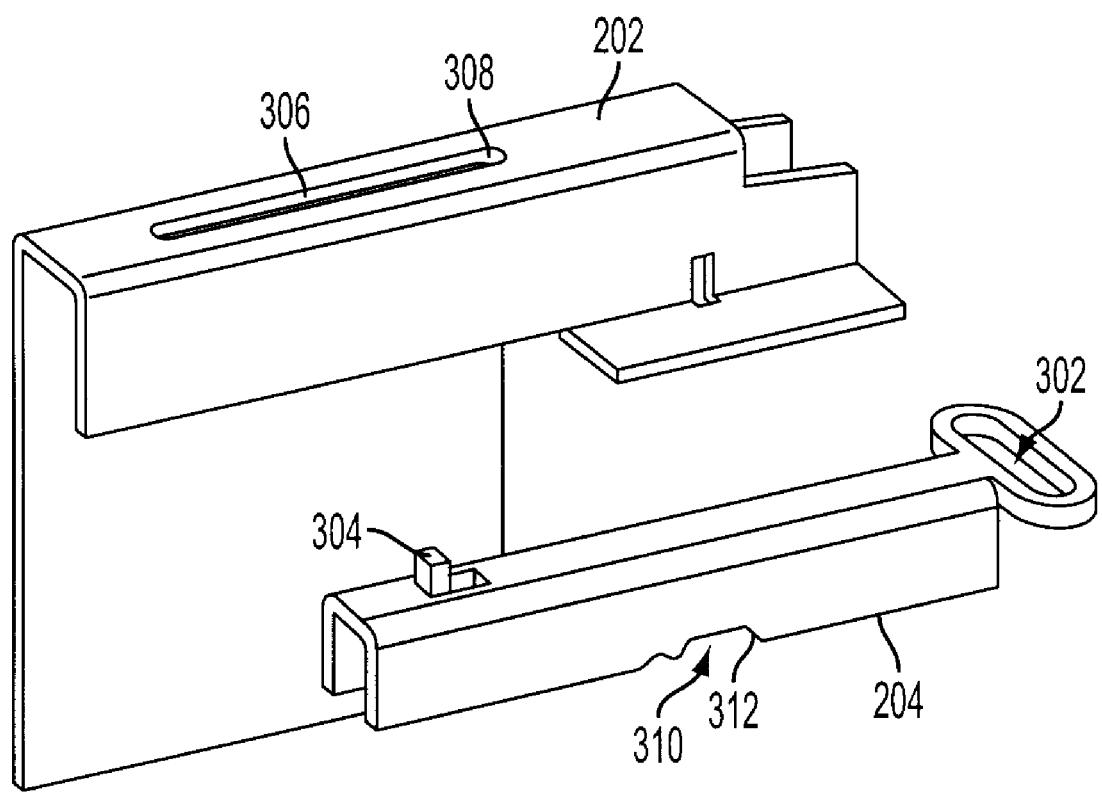
FIG. 5 is an exploded view of the bracket and follower assembly of FIG. 1.
Figure 6:
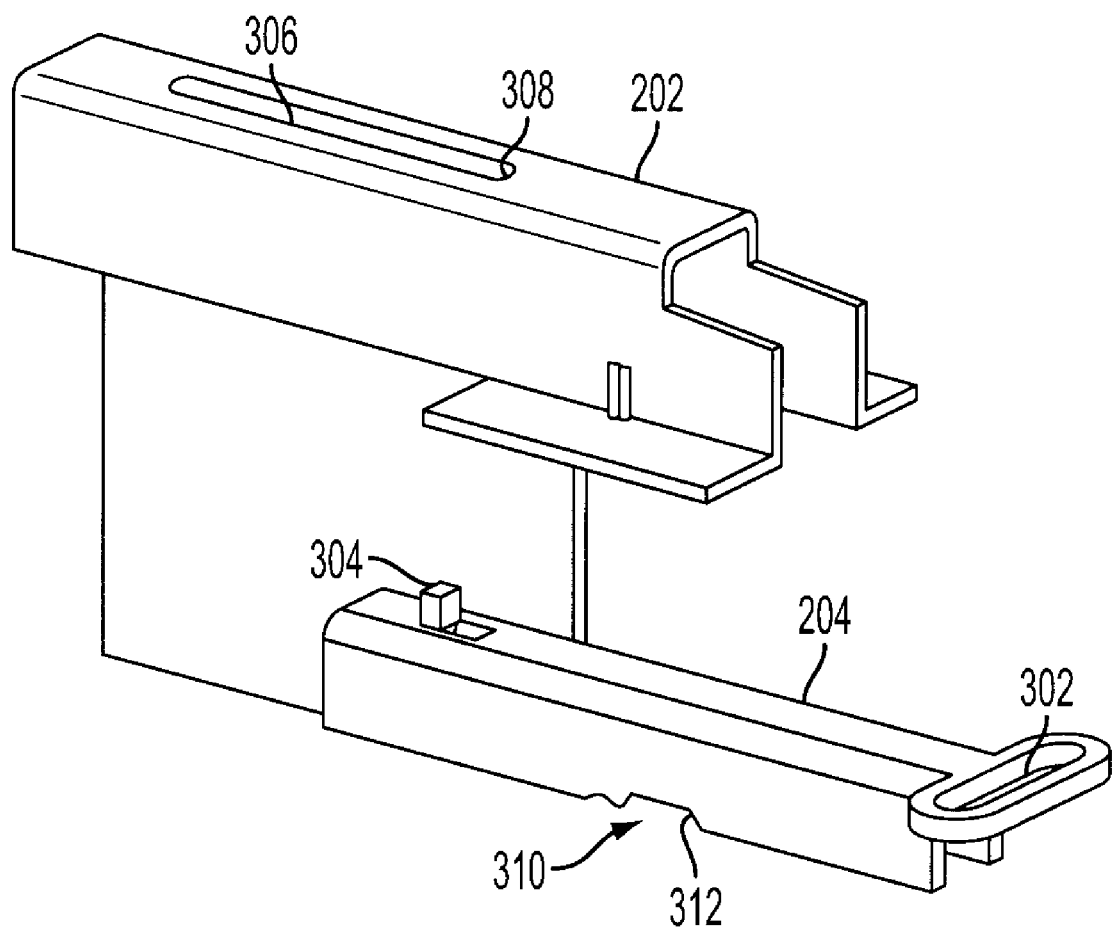
FIG. 6 is another exploded view of the bracket and follower assembly of FIG. 1.
Figure 7:
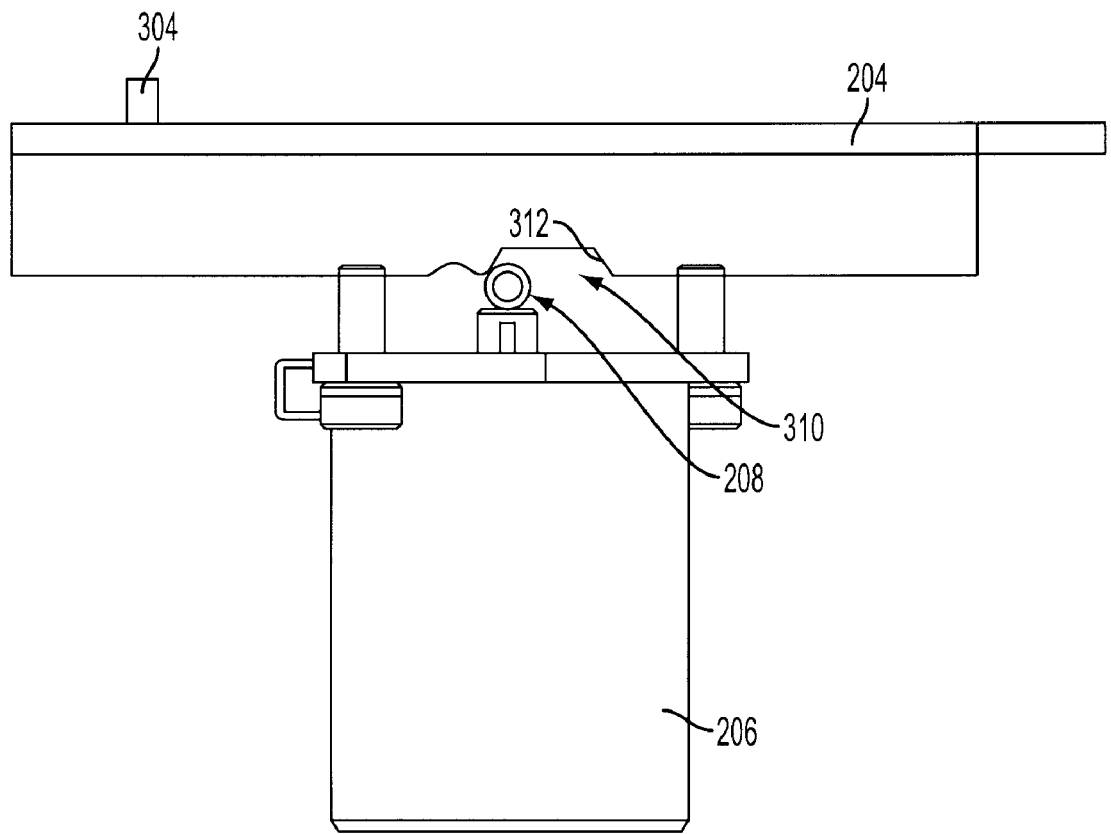
FIG. 7 is a side view of the solenoid and follower of FIG. 1.

When the ETRS system and the follower are in an out-of park position, the solenoid 206 may be energized to force the roller 208 from a slot stamped into the bracket and into a notch 310 formed in the follower 204, as shown in FIG. 3. The roller 208 may be forced into the notch 310 by the solenoid 206 with sufficient force to prevent inadvertent movement of the follower from the out-of-park position to a park position, thereby locking the ETRS system in the out-of-park position. When the solenoid 206 is denergized, the follower 204 may move back into the bracket 202 and the roller 208 may engage a ramp 312, as shown in FIG. 4. Engagement of the roller 208 with the ramp 312 forces the roller out of the notch 310 to allow the ETRS system and the follower to return to a park position.

The illustrated bracket 202 and the follower 204 configurations have a generally u-shaped cross-section and may be constructed from stamped sheet metal. Sheet metal forming can be achieved at significantly reduced cost compared to machining or die casting. Also, the cycle time and piece cost associated with sheet metal forming may be significantly improved compared to machining or die casting. The u-shaped cross-section of the bracket and follower establishes a downwardly "open" design, allowing debris to pass through the downwardly open end of the components. This minimizes or eliminates the possibility of system malfunction due to debris build-up.

The illustrated follower 204 incorporates several features, including the ramp 312, the travel limiting tab 304 and the slot 302. The slot configuration 302 may be changed to a hook or other shape to match design requirements. In addition, the roller 208 establishes a line contact with the notch 310 in the follower, as opposed to the point contact provided by a ball. This may significantly reduce stress on the follower, roller and solenoid, and may reduce or eliminate the potential for formation of an indentation at the interface of the roller 208 and the follower 204.

Figure 8:
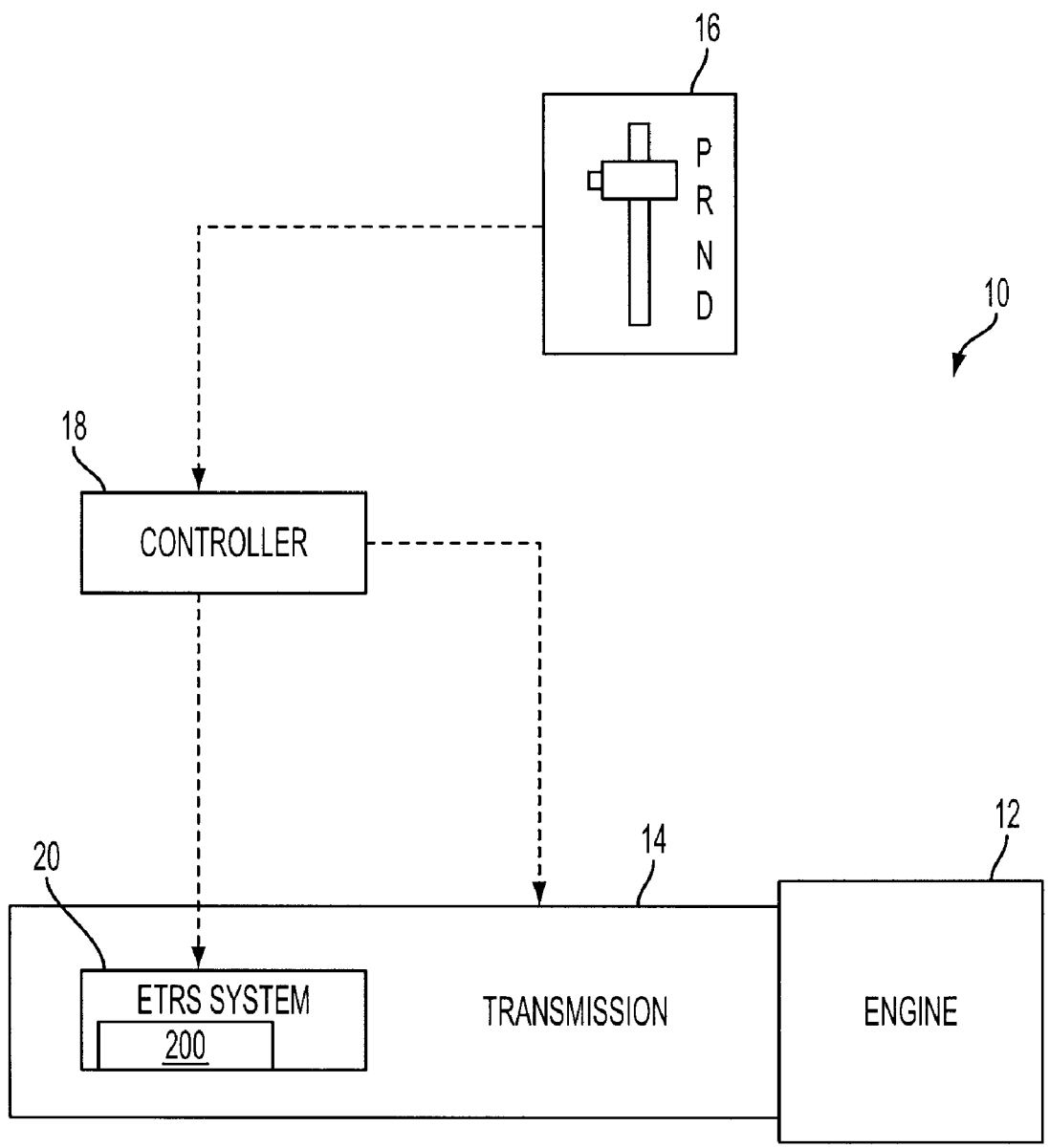
FIG. 8 is a schematic illustration of a vehicle system incorporating an electronic transmission range selector system consistent with the present invention.

Referring now to FIG. 8, a schematic illustration of a vehicle 10 incorporating a park-inhibit solenoid 200 consistent with the present invention is shown. The vehicle 10 includes an engine 12 and an automatic transmission 14. The engine 12 produces driving torque that is transferred through the transmission 14 at varying gear ratios to drive at least one pair of wheels (not shown). A driver interface device 16 enables a vehicle operator to select various transmission range positions. The driver interface device 16 can include a lever, switches, dials, push-buttons or any other type of input interface desired. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends an electric mode signal to a controller 18 based on the selected transmission range.

The controller 18 signals an electronic transmission range selection (ETRS) system 20 to shift the transmission 14 to the corresponding range in response to the electric mode signal. For purposes of clarity, the ETRS system 20 is considered to be operating in a "Park" mode when the transmission 14 is in its Park range and to be operating in an "Out-of-Park" mode when the transmission 14 is in any other of the available ranges. As shown, a park-inhibit solenoid 200 consistent with the present invention may be provided as an integral part of the ETRS system 20 to prevent shifting from the Out-of-Park mode into the Park mode under specific circumstances.

There is thus provided a park inhibit solenoid assembly of simple and reliable configuration. The bracket and follower may be generally u-shaped and constructed by stamping sheet metal, enabling cost-effective manufacturing while incorporating multiple features onto one component.

According to one aspect of the invention there is provided a park inhibit solenoid system including a bracket, at least a portion of the bracket being generally u-shaped with a downwardly oriented opening; a generally u-shaped follower at least partially received in the opening in the bracket and extendable therefrom, the follower having portions defining a notch in a wall thereof; a solenoid; a roller coupled to the solenoid, whereby upon energization of the solenoid the roller is forced into the notch.

According to another aspect of the invention there is provided an electronic transmission range selection (ETRS) system for shifting a transmission range of a vehicle transmission system including a vehicle transmission; an electronic transmission range selection (ETRS) system coupled to the transmission for placing the transmission in any of a plurality of modes selected through a user interface and a park inhibit solenoid system consistent with the invention for preventing the transmission from shifting from an Out-Of-Park mode to a Park Mode.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A park inhibit solenoid system comprising:
    a bracket, at least a portion of said bracket being generally u-shaped with a downwardly oriented opening;
    a generally u-shaped follower at least partially received in said opening in said bracket and extendable therefrom, said follower having portions defining a notch in a wall thereof;
    a solenoid;
    a roller coupled to said solenoid, whereby upon energization of said solenoid said roller is forced into said notch.

2. A system according to claim 1, wherein said bracket consists of a single piece of sheet metal.

3. A system according to claim 1, wherein said follower consists of a single piece of sheet metal.

4. A system according to claim 1, wherein said generally u-shaped follower oriented to provide a downwardly oriented opening.

5. A system according to claim 4, wherein said solenoid is positioned for force said roller upward toward said downwardly oriented opening and into said notch.

6. A system according to claim 1, wherein said generally u-shaped follower comprises first and second wall portions coupled adjacent the ends thereof by an interconnecting portion, and wherein said notch is formed in each of said first and second wall portions.

7. A system according to claim 1, wherein said notch comprises a ramp portion, said ramp portion being positioned to engage said roller after said solenoid is de-energized for forcing said roller out of said notch.

8. An electronic transmission range selection (ETRS) system for shifting a transmission range of a vehicle transmission system comprising:

a vehicle transmission;

an electronic transmission range selection (ETRS) system coupled to said transmission for placing said transmission in any of a plurality of modes selected through a user interface;

a park inhibit solenoid system comprising bracket, at least a portion of said bracket being generally u-shaped with a downwardly oriented opening;

a generally u-shaped follower at least partially received in said opening in said bracket and extendable therefrom, said follower having portions defining a notch in a wall thereof;

a solenoid;

a roller coupled to said solenoid, whereby upon energization of said solenoid said roller is forced into said notch to prevent said transmission from shifting from an Out-Of-Park mode to a Park Mode.

9. A system according to claim 8, wherein said bracket consists of a single piece of sheet metal.

10. A system according to claim 8, wherein said follower consists of a single piece of sheet metal.

11. A system according to claim 8, wherein said generally u-shaped follower oriented to provide a downwardly oriented opening.

12. A system according to claim 11, wherein said solenoid is positioned for force said roller upward toward said downwardly oriented opening and into said notch.

13. A system according to claim 8, wherein said generally u-shaped follower comprises first and second wall portions coupled adjacent the ends thereof by an interconnecting portion, and wherein said notch is formed in each of said first and second wall portions.

14. A system according to claim 8, wherein said notch comprises a ramp portion, said ramp portion being positioned to engage said roller after said solenoid is de-energized for forcing said roller out of said notch.

* * * * *